US012615548B2

(12) United States Patent
Ong et al.

(10) Patent No.: US 12,615,548 B2
(45) Date of Patent: Apr. 28, 2026

(54) METHOD AND SYSTEM FOR IMPROVING COEXISTENCE OF WIRELESS PROTOCOLS

(71) Applicant: Comcast Cable Communications, LLC, Philadelphia, PA (US)

(72) Inventors: Ivan Ong, Malvern, PA (US); Kenneth Egan, Austin, TX (US); Joseph Frank, Medford, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 435 days.

(21) Appl. No.: 18/303,026

(22) Filed: Apr. 19, 2023

(65) Prior Publication Data

US 2024/0357424 A1      Oct. 24, 2024

(51) Int. Cl.
*H04W 28/08*          (2023.01)

(52) U.S. Cl.
CPC .............................. *H04W 28/0908* (2020.05)

(58) Field of Classification Search
CPC . H04L 1/0084; H04L 27/2646; H04L 1/0083;
              H04L 27/0008; H04L 69/08; H04L
              27/2636; H04L 27/2273; H04L 27/36;
              H04W 16/14; H04W 4/80; H04W 80/00
See application file for complete search history.

(56) References Cited

U.S. PATENT DOCUMENTS

| | | | | |
|---|---|---|---|---|
| 8,750,178 | B2 * | 6/2014 | Wietfeldt | .............. H04W 76/15 |
| | | | | 370/310 |
| 9,155,103 | B2 * | 10/2015 | Wietfeldt | .......... H04W 72/1215 |
| 9,253,778 | B2 * | 2/2016 | Ye | .......................... H04W 74/06 |
| 9,596,693 | B2 * | 3/2017 | Truong | ................... H04W 4/80 |
| 10,924,990 | B2 * | 2/2021 | Tchigevsky | .......... H04W 48/20 |
| 11,122,519 | B1 * | 9/2021 | Ichapurapu | .......... H04W 52/20 |
| 11,452,110 | B1 * | 9/2022 | Jorgovanovic | .... H04W 72/1215 |
| 2011/0111701 | A1 * | 5/2011 | Park | ................... H04W 72/541 |
| | | | | 455/63.1 |
| 2014/0140381 | A1 * | 5/2014 | Sang | ...................... H04B 1/406 |
| | | | | 375/219 |
| 2016/0269971 | A1 * | 9/2016 | Kim | .................. H04W 72/1215 |
| 2017/0163521 | A1 * | 6/2017 | Hu | ......................... H04W 24/04 |
| 2017/0188181 | A1 * | 6/2017 | Jin | ......................... H04W 76/14 |
| 2017/0366990 | A1 * | 12/2017 | Emmanuel | ............ H04W 52/38 |
| 2018/0352055 | A1 * | 12/2018 | He | ......................... H04L 1/0084 |
| 2019/0132013 | A1 * | 5/2019 | Sharma | ................. H04W 72/56 |
| 2019/0373639 | A1 * | 12/2019 | Elliott | ..................... H04L 69/08 |
| 2020/0163003 | A1 * | 5/2020 | Shahar | ................... H04L 69/18 |

* cited by examiner

*Primary Examiner* — Jung Liu
(74) *Attorney, Agent, or Firm* — Banner & Witcoff, Ltd.

(57)          ABSTRACT

Systems, apparatuses, and methods are described for improving the coexistence between wireless communications via different protocols. Values for parameters associated with communications via a first protocol and/or values for parameters associated with communications via a second protocol may be used to select a coexistence configuration (e.g., pulse-width modulation). The coexistence configuration may be applied to communications via the first protocol.

21 Claims, 12 Drawing Sheets

PMW Method for Coexistence of 1$^{st}$ Protocol and 2$^{nd}$ Protocol

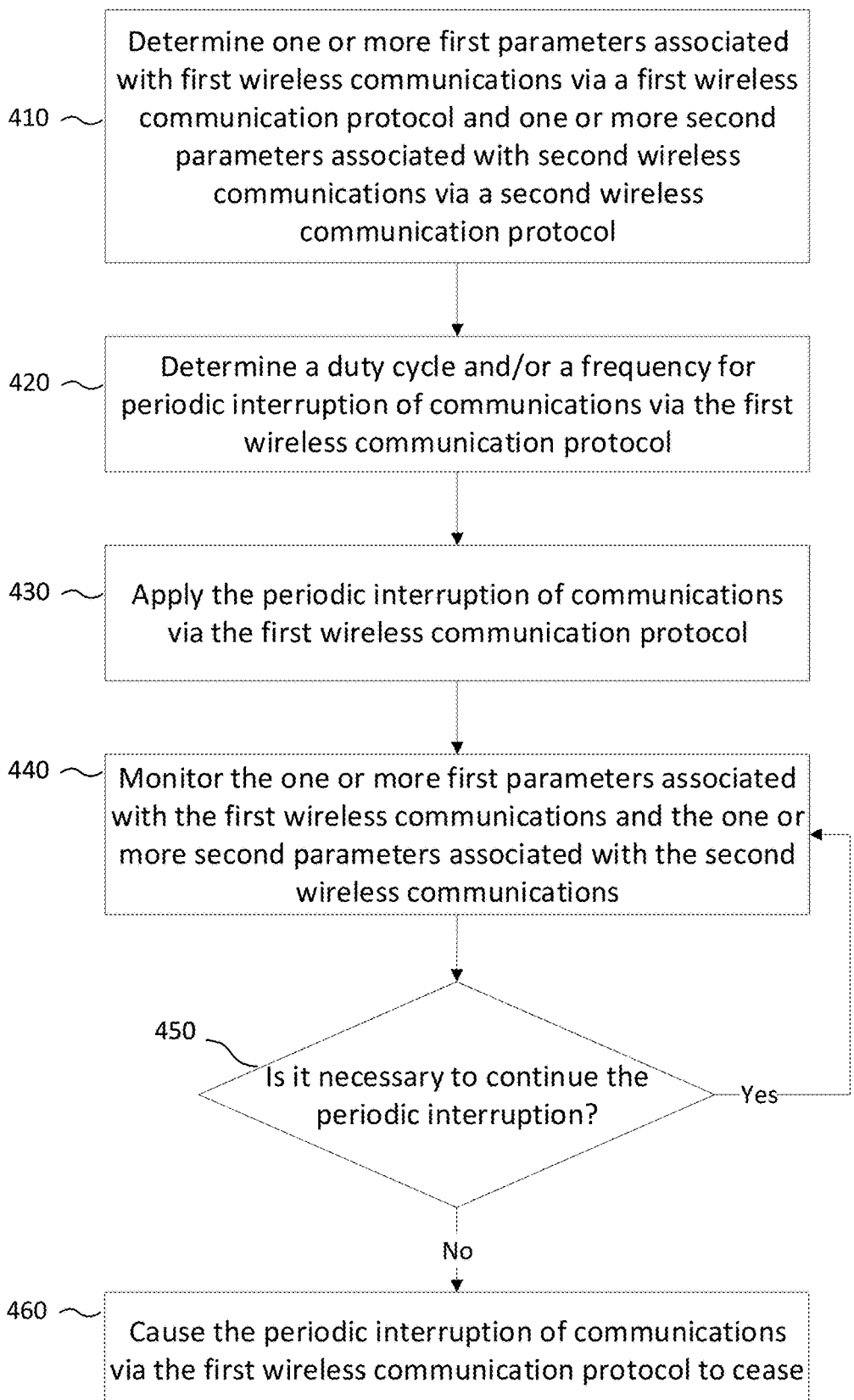

410 — Determine one or more first parameters associated with first wireless communications via a first wireless communication protocol and one or more second parameters associated with second wireless communications via a second wireless communication protocol 420 — Determine a duty cycle and/or a frequency for periodic interruption of communications via the first wireless communication protocol 430 — Apply the periodic interruption of communications via the first wireless communication protocol 440 — Monitor the one or more first parameters associated with the first wireless communications and the one or more second parameters associated with the second wireless communications 450 — Is it necessary to continue the periodic interruption?

Yes

No

460 — Cause the periodic interruption of communications via the first wireless communication protocol to cease

FIG. 4A

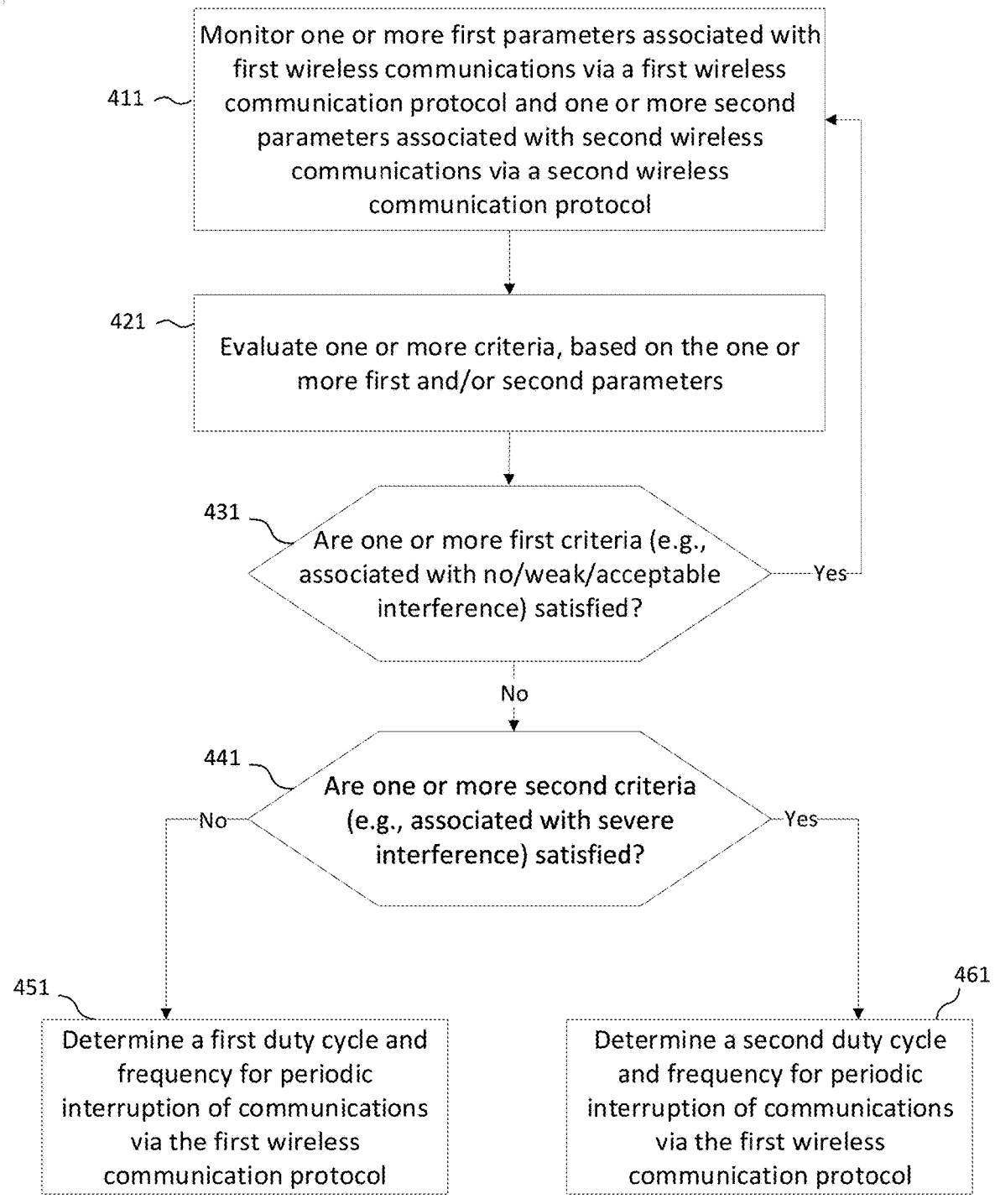

411 ~ Monitor one or more first parameters associated with first wireless communications via a first wireless communication protocol and one or more second parameters associated with second wireless communications via a second wireless communication protocol 421 ~ Evaluate one or more criteria, based on the one or more first and/or second parameters 431 ~ Are one or more first criteria (e.g., associated with no/weak/acceptable interference) satisfied? —Yes—

No

441 ~ Are one or more second criteria (e.g., associated with severe interference) satisfied? —No— —Yes—

451 ~ Determine a first duty cycle and frequency for periodic interruption of communications via the first wireless communication protocol 461 ~ Determine a second duty cycle and frequency for periodic interruption of communications via the first wireless communication protocol

FIG. 4B

METHOD AND SYSTEM FOR IMPROVING COEXISTENCE OF WIRELESS PROTOCOLS

BACKGROUND

More than one type of wireless protocol for wireless communications may be used in an environment to support electronic devices such as laptops and Internet-of-Things (IoT) devices such as smart sensors. Such wireless protocols may, for example, include WI-FI wireless communication protocols, ZIGBEE wireless communication protocols, BLUETOOTH Low Energy (BLE) wireless communication protocols, etc. Communications via different wireless protocols may use the same frequency band, for example, a 2.4 GHz channel, to transmit and/or receive signals. Conflicts may arise if one or more of these communications have heavy traffic loads and a shared frequency band becomes congested. For example, WI-FI wireless communications may experience high volumes in the evenings as people are at home using WI-FI devices to stream, download, and upload various digital content. Signals of less powerful wireless protocols such as ZIGBEE may have a deteriorated quality due to the interference from the WI-FI signals. Coexistence configurations may be used to help signals of the less powerful wireless protocols to be received. However, implementing such configurations may undesirably impact the performance of communications, according to other wireless communication protocols, that may be causing interference.

SUMMARY

The following summary presents a simplified summary of certain features. The summary is not an extensive overview and is not intended to identify key or critical elements.

Systems, apparatuses, and methods are described for improving and/or optimizing the coexistence between wireless communication protocols, for example, a first wireless communication protocol (e.g., WI-FI wireless communication protocol) and a second wireless communication protocol (e.g., ZIGBEE wireless communication protocol). Selected parameters associated with the wireless communication protocols may be monitored and used to determine if a coexistence configuration should be enabled. Further, an optimized setting of the coexistence configuration may be chosen based on these parameters and/or user preferences. A coexistence configuration may, for example, comprise briefly and/or periodically reducing and/or turning off signals in first wireless communications via the first wireless communication protocol so that second wireless communications via the second wireless communication protocol may be received. The optimized setting for a given set of parameter values and device information associated with wireless communications may be obtained through an analysis that may use Media Access Control (MAC) layer information (e.g., failure, retries) to quantify the performance of associated devices. The performance of the second wireless communications may also be monitored using the MAC layer information (e.g., failure, retries). This optimized coexistence configuration may enable devices that use the first wireless communication protocol and/or the second wireless communication protocol to both function properly and thus may improve user experience. The reduced failure and retries of peripheral devices communicating via the second wireless communication protocol may also save power consumption (e.g., battery power).

These and other features and advantages are described in greater detail below.

BRIEF DESCRIPTION OF THE DRAWINGS

Some features are shown by way of example, and not by limitation, in the accompanying drawings In the drawings, like numerals reference similar elements.

FIG. 4A is a flowchart showing an example method of applying a PWM setting to first wireless communications and disabling the setting if interference mitigation is not needed.

FIG. 4B is a flowchart showing an example method of applying different PWM settings to first wireless communications based on level of interference.

DETAILED DESCRIPTION

Figure 1:
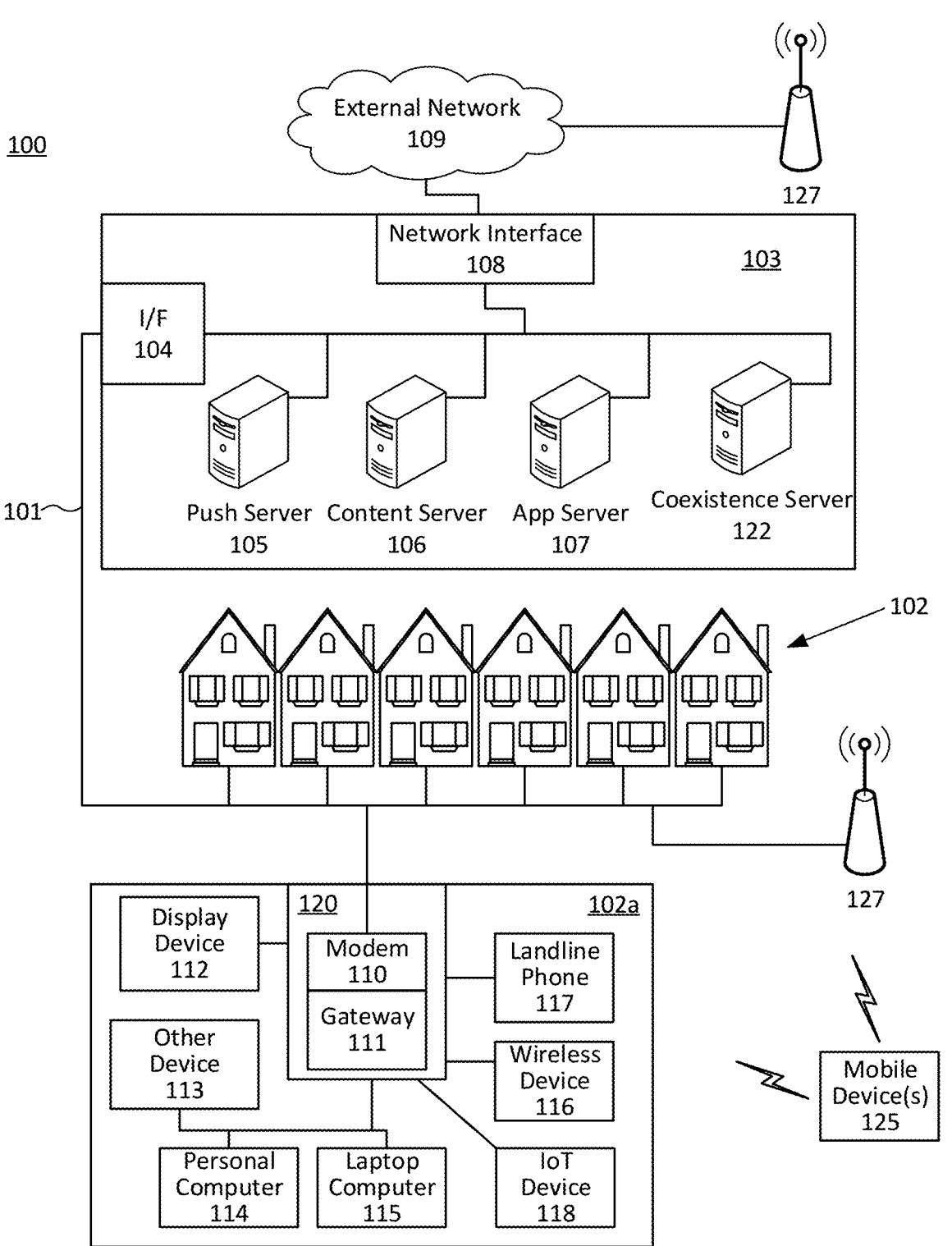
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

Figure 2:
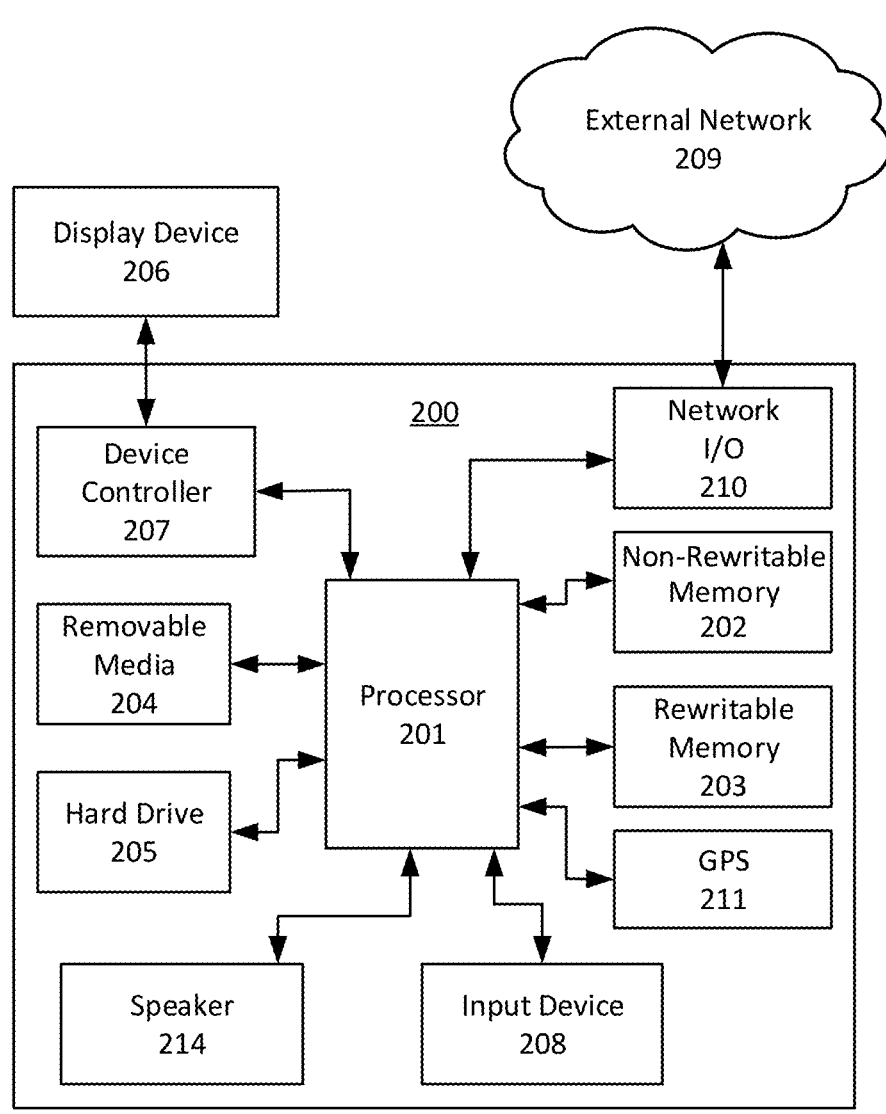
FIG. 2 shows hardware elements of a computing device.

The elements in FIG. 1 and/or FIG. 2 are examples of elements that may perform operations described in later figures. FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WI-FI IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smartphones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, for example, via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The coexistence server 122 may comprise a database with settings for coexistence configurations for enhancing second wireless communications via a second wireless communication protocol (e.g., ZIGBEE wireless communication protocol) in an environment shared with first wireless communications via a first wireless communication protocol (e.g., WI-FI wireless communication protocol). For example, the database may contain settings related to a time duration (e.g., duty cycle) and/or a frequency for turning off the first wireless communications. The coexistence server 122 may communicate with a gateway router (e.g., the gateway 111) that supports the first wireless communication protocol and the second wireless communication protocol and provide a setting for the coexistence configuration in the gateway router. The coexistence server 122 may also communicate with a separate controller (e.g., software such as an application program (APP) in an electronic device) which may retrieve a setting from the coexistence server 122 and send the setting to the gateway router to be applied to the coexistence configuration. The local office 103 may comprise additional servers, such as the coexistence server 122 (described herein), additional push, content, and/or application servers, and/or other types of servers. Although shown separately, the push server 105, the content server 106, the application server 107, the coexistence server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein. Also or alternatively, one or more servers 105, 106, 107, and/or 122 may be part of the external network 109 and may be configured to communicate (e.g., via the local office 103) with computing devices located in or otherwise associated with one or more premises 102.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, for example, display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), IoT devices 118 (e.g., smart sensors, smart doorbells, smart thermostat, smart plugs, smart sprinklers, etc.), and any other desired devices. Example types of local networks comprise Multimedia Over Coax Alliance (MoCA) networks, Ethernet networks, networks communicating via Universal Serial Bus (USB) interfaces, one or more wireless networks (e.g., IEEE 802.11, IEEE 802.15, BLUETOOTH, ZIGBEE), networks communicating via in-premises power lines, and others. For example, the gateway 111 may be configured to communicate with some wireless devices such as mobile phones via an IEEE 802.11 wireless communication protocol and to communicate with some other wireless devices such as some IoT devices via an IEEE 802.15.4 wireless communication protocol. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices connected to the external network 109) and any other computing devices discussed herein (e.g., wireless gateway, controller, counters, programmable chips, tablets, smartphones, IoT sensors, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other wired or wireless network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device

200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Examples described herein may refer to first wireless communications and to second wireless communications that may coexist in a premises or other environment. The first wireless communications may be sent and received according to one or more first wireless communication protocols. The first wireless communication protocols may, for example, comprise one or more local area network wireless protocols such as the IEEE 802.11 family of protocols. The second wireless communications may be sent and received according to one or more second wireless communication protocols. The second wireless communication protocols may, for example, comprise one or more personal area network wireless protocols such as the IEEE 802.15.4 family of protocols, ZIGBEE protocols, etc. The second wireless communications may, for example be at lower power levels than the first wireless communications. The second wireless communication protocols may, for example, be configured for low-rate data transfer. The second wireless communication protocols may, for example, be configured for communication of smaller amounts of data than the first wireless protocols. The second wireless communication protocols may, for example, be configured to be simpler, less robust, and/or less expensive than the first wireless protocols.

Figure 3:
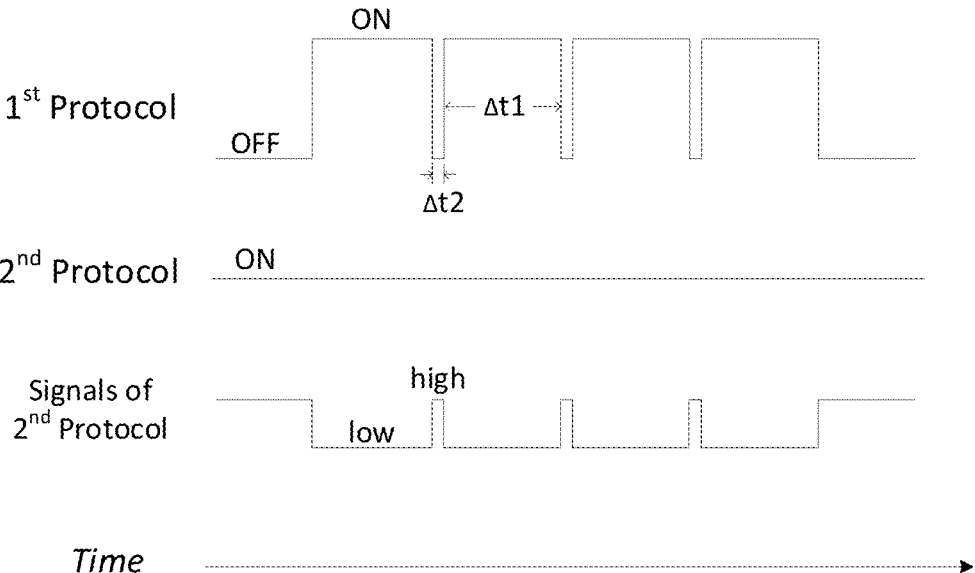
FIG. 3 shows an example method of using pulse-width modulation (PWM) to enhance coexistence between wireless communications via different protocols.

FIG. 3 shows an example method of using pulse-width modulation (PWM) to enhance coexistence between wireless communications via different protocols. For example, there may be first wireless communications via a first wireless communication protocol and second wireless communications via a second wireless communication protocol. The first wireless communications protocol and the second wireless communications protocol may be using the same frequency band (e.g., a 2.4 GHz channel). The first wireless communications may be at a higher power level than the second wireless communications. A PWM method may comprise applying the technique of PWM to reduce cumulative power associated with the first wireless communications so as to enhance the coexistence between the first wireless communications and the second wireless communications under conditions in which conflicts may be more likely. As shown in FIG. 3, in conflictual conditions, if the first wireless communications are on, the second wireless communications received by at least one peripheral (or client) device may have a weaker signal due to the utilization of the band by the first wireless communications. If the first wireless communication protocol is heavily used (e.g., if a channel utilization of the first wireless communications is over 50%), the signal received for the second wireless communications may become weaker or even zero. This is not desired as the communications to and/or from peripheral devices using the second wireless communication protocol may be impaired and/or ceased due to weaker or zero signal. For example, peripheral devices may comprise smart door locks, smart thermostats, etc. These peripheral devices may need to send detected information (e.g., motion, temperature) to a controller and/or to receive instructions from the controller in order for one or more systems (e.g., home automation systems) to function properly. If the communications to and/or from the peripheral devices are too weak or non-existent, these devices may cease to work properly and may cause problems to users. The PWM method "slices" time slots in the first wireless communications, and during those time slots, the first wireless communications has a low or zero power level. For example, the first wireless communications may be turned off during those time slots and become "silent". At the same time slots, the second wireless communications may remain ON. The silent or near silent first wireless communications may increase room in the frequency band which may be beneficial for the transmission and/or reception of the second wireless communications. As shown in FIG. 3, the power levels of received second wireless communications during those time slots may be significantly higher. If the PWM method is being used, the time slots in the first wireless communications may appear periodically and at a frequency. For example, the first wireless communications may be turned off for a time duration of Δt2, turned on for a time duration of Δt1, turned off for a time duration of Δt2, . . . , repeating this pattern. The second wireless communications may continue throughout the ON/OFF process of the first wireless communications (as shown in FIG. 3) or may operate normally in other ways (e.g., signals may be sent once every 5 seconds). This may reduce control work load for the wireless communications, because at least the second wireless communications may not need special control. Alternatively, the second wireless communications may operate in a manner timed based on the ON/OFF pattern of the first wireless communications. For example, the second wireless communications may be ON only during the OFF period of the first wireless communications. Regardless of the transmission pattern of the second wireless communications, the second wireless communications may benefit from the periodic gaps of the first wireless communications. The OFF gaps in the first wireless communications may reduce overall power level, noise, etc. in the shared band and thus allow signals of the second wireless communications to pass through the band. For example, during the time duration of Δt2 when the first wireless communications are OFF, the second wireless communications may have better transmission and/or reception of signals, and the signals may be at a relatively normal and/or high power level. Such normal and/or high power level signals of the second wireless communication protocol during the periodic OFF time of the first wireless communications may be sufficient to support the operations of at least some peripheral devices, for example, some IoT devices (e.g., smart sensors). The first wireless communications may benefit from the periodic tiny gaps of the first wireless communications. For example, if the first wireless communications are turned on and off at a relatively high frequency (e.g., 12 times a second) and/or each time duration when the first wireless communications are off is relatively short (e.g., 7.8 milliseconds), the first wireless communications may appear to be ON all the time, and at least some of the peripheral devices communicating via the first wireless communication protocol may still function. A time duration and/or frequency for turning off the first wireless communications may be referred to as a PWM setting.

The PWM setting may comprise duty cycle. A duty cycle may comprise a ratio of the time duration when the first wireless communications are OFF (e.g., Δt2) compared to the time duration when the first wireless communications are ON (e.g., Δt1). The duty cycle may be a percentage expressed by the following equation:

$$\text{duty cycle} = \Delta t2/(\Delta t1 + \Delta t2)$$

The duty cycle may be used to express how large a time slot of the first wireless communications being silent is. For example, if Δt1 is 9 times Δt2, the duty cycle is 10%. The duty cycle may be combined with frequency F to express the PWM setting. For example, the frequency F may be 78 ms (millisecond). A PWM setting of 78 ms/10% (format: F/duty cycle) may indicate that every 78 milliseconds, the first wireless communications may be off for 7.8 milliseconds. For another example, a PWM setting may be 139 ms/15%. This may indicate that every 139 milliseconds, the first wireless communications may be off for 20.85 milliseconds. This may be a more aggressive PWM setting than the previous example.

First wireless communications may not always interfere with second wireless communications. In a non-congested situation, for example, if the first wireless communications do not have heavy traffic, the second wireless communications may not be impaired or substantially impaired if the first wireless communications remain ON and PWM is not enabled. Applying PWM all the time and regardless of wireless environmental characteristics may be undesirable and may noticeably and adversely (and/or unnecessarily) affect performance of devices communicating via the first wireless protocol.

FIG. 4A is a flowchart showing an example method of applying a PWM setting to first wireless communications and disabling the setting if interference mitigation is not needed. For convenience, the example method of FIG. 4A is explained below using an example in which steps may be performed by a computing device. That computing device may comprise a wireless gateway (e.g., gateway 111 in FIG. 1) that communicates with peripheral devices/clients via the first wireless communication protocol and/or that communicates with peripheral devices/clients via the second wireless communication protocol. Also or alternatively, the computing device may be a separate computing device that can communicate with one or more wireless gateways. A wireless gateway may have all-in-one functions, such as router functions and access point functions. The first wireless communications and the second wireless communications may use the same wireless gateway, which may support multiple protocols, or may use different wireless gateways. Peripheral devices/clients communicating via the first wireless protocol may, for example, comprise electronic devices such as laptops, tablets, phones, wireless printers, home security cameras, and/or other computing devices. Peripheral devices/clients communicating via the second wireless protocol may, for example, comprise IoT devices such as smart doorbells, smart thermostats, smart plugs, smart sprinklers, and/or other computing devices. One, some, or all steps of the example method of FIG. 4A may also or alternatively be performed by one or more other computing devices (e.g., the wireless devices 116, IoT devices 118, etc. in FIG. 1). One or more steps of the example method may be rearranged (e.g., performed in a different order), omitted, and/or otherwise modified, and/or other steps added.

In step 410, a computing device may determine one or more first parameters associated with first wireless communications via the first wireless communication protocol and one or more second parameters associated with second wireless communications via the second wireless communication protocol. The one or more first parameters associated with the first wireless communications may comprise signal-to-noise ratio (SNR), channel utilization, and/or average received signal strength indicator (average RSSI). SNR may be a measurement that compares the level of a desired signal to the level of background noise. SNR may be defined as the ratio of signal power to the noise power. If the SNR for the first wireless communications is high (e.g., 40 dB), the first wireless communications may be strong and/or the signal quality may be good. Channel utilization may be a percentage of time a channel is used. If the channel utilization associated with the first wireless communications is high (e.g., exceeding 50%), the first wireless communications may be using band space that the second wireless communications may need. RSSI may be a measurement of power level received by a peripheral (or client) device. If an average RSSI associated with the first wireless communications is high, the first wireless communications may be strong and/or the traffic for the first wireless communications may be not too heavy. These parameters associated with the first wireless communications may be obtained from a wireless gateway that communicates via the first wireless communication protocol (e.g., from IEEE 802.11 management frames and/or from a client list). A client list may be a table that displays all clients (e.g., client devices) that are currently connected to a wireless network. The one or more second parameters associated with the second wireless communications may comprise retransmission rate (or retries), error rate (or failure), and average RSSI. Retransmission rate and error rate may be Media Access Control (MAC) layer information. If the retransmission rate and/or the error rate are (is) high (e.g., exceeding 2% for the retransmission rate, 11% for the error rate), the second wireless communications may have difficulty successfully transmitting or receiving signals. If an average RSSI for peripheral devices associated with the second wireless communications is high (e.g., −57 dBm), the second wireless communications may have strong signals. These parameters associated with the second wireless communications may be obtained from a wireless gateway that communicates via the second wireless communication protocol (e.g., IEEE 802.15.4 management frames and/or a client list).

In step 420, the computing device may determine a duty cycle and/or a frequency for periodic interruption of communications via the first wireless communication protocol (e.g., a PWM setting). The determining of the PWM setting may be based on a default setting (e.g., 78 ms/10%). Alternatively, the determining of the PWM setting may be based on the one or more first parameters and/or one or more second parameters as determined in step 410. For example, the computing device may comprise a database and/or a table in which there may be predetermined PWM settings with corresponding values of the first parameters and/or second parameters. For example, a less aggressive PWM setting (e.g., 78 ms/10%) may correspond to relatively low channel utilization of the first wireless communications and/or a relatively high average RSSI of the second wireless communications. A more aggressive PWM setting (e.g., 139 ms/15%) may correspond to relatively high channel utilization of the first wireless communications and/or a relatively low average RSSI of the second wireless communications. The Table 1 below shows a few examples indicating the correspondence between the parameters of the second communications (e.g., the second parameters) and the PWM settings. Table 1 also shows an example where the PWM is not needed.

TABLE 1

| Example # | Avg RSSI | Retransmission Rate | Error Rate | Enable PWM | PWM Setting |
|---|---|---|---|---|---|
| 1 | −62 dBm | 24% | 5% | Y | 78 ms/10% |
| 2 | −67 dBm | 48% | 11% | Y | 139 ms/15% |
| 3 | −57 dBm | 15% | 7% | N | — |

Peripheral devices such as door locks, door sensors, thermostats may communicate via the second wireless communication protocol. As shown in Table 1, if the average RSSI is relatively high and the retransmission rate and error rate are relatively low (e.g., in Example #3), there may be no need to enable coexistence configurations such as PWM. If the average RSSI is relatively low, and if the retransmission rate and/or error rate are relatively low (e.g., in Example #1), PWM may be enabled with a relatively less aggressive PWM setting. If the average RSSI is relatively low, and if the retransmission rate and/or error rate are relatively high (e.g., in Example #2), PWM may be enabled with a relatively more aggressive PWM setting. Whether the coexistence configurations such as PWM may be enabled or not and to what degree they are enabled may depend on determination of whether the average RSSI and one or more of the retransmission rate (or retry rate, retries) and error rate (or failure rate) satisfy predetermined thresholds. The predetermined thresholds may be determined through tests, simulations, etc.

The values of the second parameters in Table 1 are examples. There may be various number and/or types of peripheral devices communicating via the second wireless communication protocol in an environment shared with the first wireless communications. The values of the second parameters may be average values for all peripherals devices that communicate via the second wireless communication protocol. Alternatively, the values of the second parameters may be average values of a type of peripheral devices that communicate via the second wireless communication protocol. For example, the values of the second parameters may be average values for multiple door sensors that communicate via the second wireless communication protocol. If more than one type of peripheral devices that communicate via the second wireless communication protocol exist in the same environment, for example, both the door locks and the door sensors are in the same house, how the coexistence configurations such as PWM may be used may depend on average values for all the peripheral devices communicating via the second wireless communication protocol (e.g., both the door locks and the door sensors), or may depend on specified priority rules. The specified priority rules may comprise rules that are based on actual average values, type of peripheral devices, user preference, and/or any other rules. For example, PWM may be enabled if the average values of at least one type of peripheral devices satisfy thresholds for turning on the PWM setting with a less aggressive setting (e.g., 78 ms/10%). The PWM setting may start from the less aggressive setting, and may change to a more aggressive setting (e.g., 139 ms/15%) if communications of at least one type of peripheral devices become worse. Alternatively, the PWM setting may start from a more aggressive setting, if the average values of at least one type of peripheral devices satisfy thresholds for turning on the PWM setting with a more aggressive setting. For another example, if a user gives priority to one type of peripheral devices over another, a PWM setting suitable for the prioritized type of devices may be selected based on the average values of the prioritized type. For example, if a user determines that the door lock has priority over the door sensor, a PWM setting suitable for the door lock (e.g., a relatively less aggressive PWM setting) may be selected. This PWM setting may be insufficient for the door sensor to operate properly, which may be acceptable because of the lower priority of the door sensor.

In step 430, the computing device may also cause the periodic interruption (e.g., PWM setting) to be applied by the wireless gateway associated with the first wireless communication protocol. For example, the computing device may send an instruction with the determined PWM setting to the wireless gateway, and the wireless gateway may turn off the first wireless communications periodically according to the duty cycle and frequency. If the computing device is part of the wireless gateway, steps 410, 420 and 430 may be programmed into a built-in control process in the wireless gateway.

In step 440, the computing device may monitor the one or more first parameters associated with the first wireless communications and the one or more second parameters associated with the second wireless communications. The monitoring of the one or more first and/or second parameters may comprise retrieving values of the parameters and comparing the one or more first and/or second parameters with predetermined thresholds. The comparing may involve pre-processing and/or pre-calculating of one or more parameters. For example, for one or more second parameters (e.g., average RSSI, retransmission rate, error rate), a formula may be used to calculate an average value "A" based on values of the second parameters:

$$A = \left( \sum_n \text{avg\_RSSI} + \sum_n \text{retransmission } \% + \sum_n \text{error } \% \right) / n$$

where $\sum_n$avg RSSI=sum, over n reporting periods of average RSSI values from a peripheral device communicating via the second communications protocol;

$\sum_n$retransmission %=sum, over n reporting periods of retransmission rate values from the peripheral device communicating via the second communications protocol;

$\sum_n$error %=sum, over n reporting periods of error rate values from the peripheral device communicating via the second communications protocol.

The calculated value A may be compared to a predetermined threshold to determine, for example, whether to continue (or initiate) periodic interruption. The calculated value A may be for all peripheral devices communicating via the second communications protocol based on averaged values for all the peripheral devices. Alternatively, the calculated value A may be for a type of peripherals devices that communicate via the second wireless communication protocol.

In step 450, the computing device may determine if it is necessary to continue the periodic interruption (e.g., PWM setting) of the first wireless communications. The determining may comprise comparing, with predetermined thresholds, value(s) of one or more first and/or second parameters and/or calculated value(s) (e.g., A) of one or more first and/or second parameters. The computing device may determine that continuing the periodic interruption is unnecessary, if the value(s) and/or calculated value(s) satisfy predetermined thresholds. The computing device may determine that it is necessary to continue the periodic interruption, if the value(s) and/or calculated value(s) satisfy predetermined thresholds. For example, if the value(s) of one or more first parameters (e.g., SNR, channel utilization) are below certain thresholds (e.g., SNR drops below 20 dB, and channel utilization drops below 10%), there may be a determination of not continuing the periodic interruption of the first wireless communications, because the frequency band does not appear to be congested. For another example, if the calculated value of A is above a predetermined threshold, there may be a determination of continuing the periodic interruption of the first wireless communications, because the performance of the peripheral devices of the second wireless communications appear to be impaired. If the computing device determines in step 450 that it is not necessary to continue the periodic interruption, the computing device may in step 460 cause the periodic interruption of communications via the first wireless communication protocol to cease. If the computing device determines in step 450 that it is necessary to continue the periodic interruption, the computing device may repeat step 440 for continued monitoring of the parameters.

In step 460, the periodic interruption of communications via the first wireless communication protocol (e.g., PWM method) may be caused to cease. The first wireless communications may be kept on. This may correspond to a night-time, non-busy schedule of the first wireless communications (e.g., WI-FI wireless communications), and there may be no need to enable PWM.

A level of interference may indicate how badly signals of at least two wireless communication protocols interfere with each other. A higher level of interference may correspond to more severe adverse effects on wireless communications via the second wireless communication protocol having a lesser power level.

FIG. 4B is a flowchart showing an example method of applying different PWM settings to first wireless communications based on level of interference. For convenience, the example method of FIG. 4B is explained below using an example in which steps may be performed by a computing device. That computing device may comprise a wireless gateway, as described above in connection with FIG. 4A. One, some, or all steps of the example method of FIG. 4B may also or alternatively be performed by one or more other computing devices (e.g., the wireless devices 116, IoT devices 118, etc. in FIG. 1). One or more steps of the example method may be rearranged (e.g., performed in a different order), omitted, and/or otherwise modified, and/or other steps added.

In step 411, a computing device may monitor one or more first parameters associated with first wireless communications via a first wireless communication protocol and one or more second parameters associated with second wireless communications via a second wireless communication protocol. Similar to what was described with respect to FIG. 4A, the one or more first parameters may comprise SNR, channel utilization, and average RSSI; the one or more second parameters may comprise retransmission rate, error rate, and average RSSI. Values of these parameters may be obtained by the computing device through communicating with at least one wireless gateway associated with the first wireless communications and/or the second wireless communications, via corresponding IEEE management frames (e.g., IEEE 802.11 and IEEE 802.15.4) and client lists.

In step 421, the computing device may evaluate one or more criteria, based on the one or more first and/or second parameters. Results from the evaluation may be related to different levels of interference associated with communications via the second wireless communication protocol. The results from the evaluation may be used to decide whether to use interference mitigation (e.g., using PWM method), as will be described in detail with respect to steps 431-461.

In step 431, the computing device may determine if one or more first criteria (e.g., associated with no, weak and/or acceptable interference) are satisfied. For example, if SNR and channel utilization for the first wireless communications are at or below predetermined thresholds (e.g., SNR is at or below 20 dB, and channel utilization is at or below 10%), the computing device may determine that the first criteria are satisfied. This result may be associated with no, weak, and/or acceptable interference and may indicate that the band is not congested and that the interference between the first wireless communications and the second wireless communications may be low. For another example, if the average RSSI for the second wireless communications is high (e.g., associated with severe interference which may indicate that the band is very congested and that the interference between the first wireless communications and the second wireless communications may be severe. The weaker wireless communications (e.g., the second wireless communications) may have difficulty in transmission and/or reception. If the computing device determines that one or more second criteria are satisfied, the computing device may in step 461 determine a second duty cycle and frequency (e.g., a second PWM setting) for periodic interruption of communications via the first wireless communication protocol. This second PWM setting may be more aggressive (e.g., 139 ms/15%) to allow for more opportunities for the second wireless communications to be received. If the computing device determines that one or more second criteria are not satisfied, which may be associated with a middle level of interference between acceptable interference and severe interference, the computing device may in step 451 determine a first duty cycle and frequency (e.g., a first PWM setting) for periodic interruption of communications via the first wireless communication protocol. This first PWM setting may be less aggressive (e.g., 78 ms/10%), which may enable the second wireless communications to be received while minimizing impact to the first wireless communications.

Table 2 below shows examples of parameters, corresponding levels of interference and PWM settings:

TABLE 2

| SNR 1$^{st}$ w'less comms. | Channel Util. 1$^{st}$ w'less comms. | Avg RSSI 2$^{nd}$ w'less comms. | Retrans. Rate 2$^{nd}$ w'less comms. | Error Rate 2$^{nd}$ w'less comms. | Level of Interf. | Enable PWM | PWM Setting |
|---|---|---|---|---|---|---|---|
| 20 dB | 10% | −57 dBm | 15% | 7% | Weak | N | — |
| 30 dB | 45% | −62 dBm | 24% | 5% | Middle | Y | 78 ms/10% |
| 40 dB | 80% | −67 dBm | 48% | 11% | Severe | Y | 139 ms/15% | exceeding −60 dBm), and the retransmission rate and/or error rate are low (e.g., lower than 20%, 10%, respectively), the computing device may also determine that the first criteria are satisfied. For another example, the value A as described above may indicate no or weak or acceptable interference and may result in a determination that the first criteria are satisfied. If the computing device determines that one or more first criteria are satisfied, the computing device may repeat step 411 to monitor the parameters, and without enabling a coexistence configuration (e.g., PWM). The weaker wireless communications (e.g., the second wireless communications) may be unaffected in this situation, and there may be no need to interrupt or otherwise modify the stronger wireless communications (e.g., the first wireless communications). If the computing device determines that one or more first criteria are not satisfied, the computing device may in step 441 make further determinations in relation to one or more second criteria.

In step 441, the computing device may determine if one or more second criteria (e.g., associated with severe interference) are satisfied. For example, if SNR and channel utilization for the first wireless communications are above predetermined thresholds values (e.g., SNR is at 40 dB, and channel utilization is at 80%), and/or if the average RSSI for the second wireless communications is very low and the retransmission rate and/or error rate are very high (e.g., the average RSSI is-70 dBm, the retransmission rate is 50%, the error rate is 15%), and/or if the value of A is indicative of severe interference, the computing device may determine that the second criteria are satisfied. This result may be The values of first and/or second parameters in Table 2 are examples. The results of determination, corresponding values of the first and/or second parameters, associated levels of interference, and PWM settings may be output to a database.

The criteria may be more than two, which may correspond to more than three levels of interference. For example, the Middle level may comprise further divided middle levels. For each level that is associated with enabling PWM, there may be one or more PWM settings. The PWM settings may be different from those examples as shown above. The level of interference may correspond to discrete and/or continuous values, and those values may correspond to respective PWM settings. The computing device may communicate with a database that has all the PWM settings. The database may also have data associated with level of interference and/or parameters that correspond to at least one optimal PWM setting. For example, a PWM setting of "78 ms/10%" may correspond to "Middle" in level of interference and may correspond to 45% and/or other values for channel utilization, −62 dBm and/or other values of average RSSI, etc. A "Severe" level of interference may correspond to a PWM setting of "139 ms/15%" and/or other PWM settings. The computing device may obtain at least one optimal PWM setting by searching the database using the determined level of interference and/or values of parameters, as described above. The database may be located in the wireless gateway, in a separate electronic device (e.g., datacenter, laptop, etc.), and/or in the coexistence server 122 as shown in FIG. 1. The data in the database, such as PWM settings, corresponding parameters, etc., may be obtained through tests and/or real-life scenarios. The tests may be on-site tests with simulated peripheral devices. The real-life scenarios may be from various real-life premises such as people's homes with real-life electronic devices.

Figure 5:
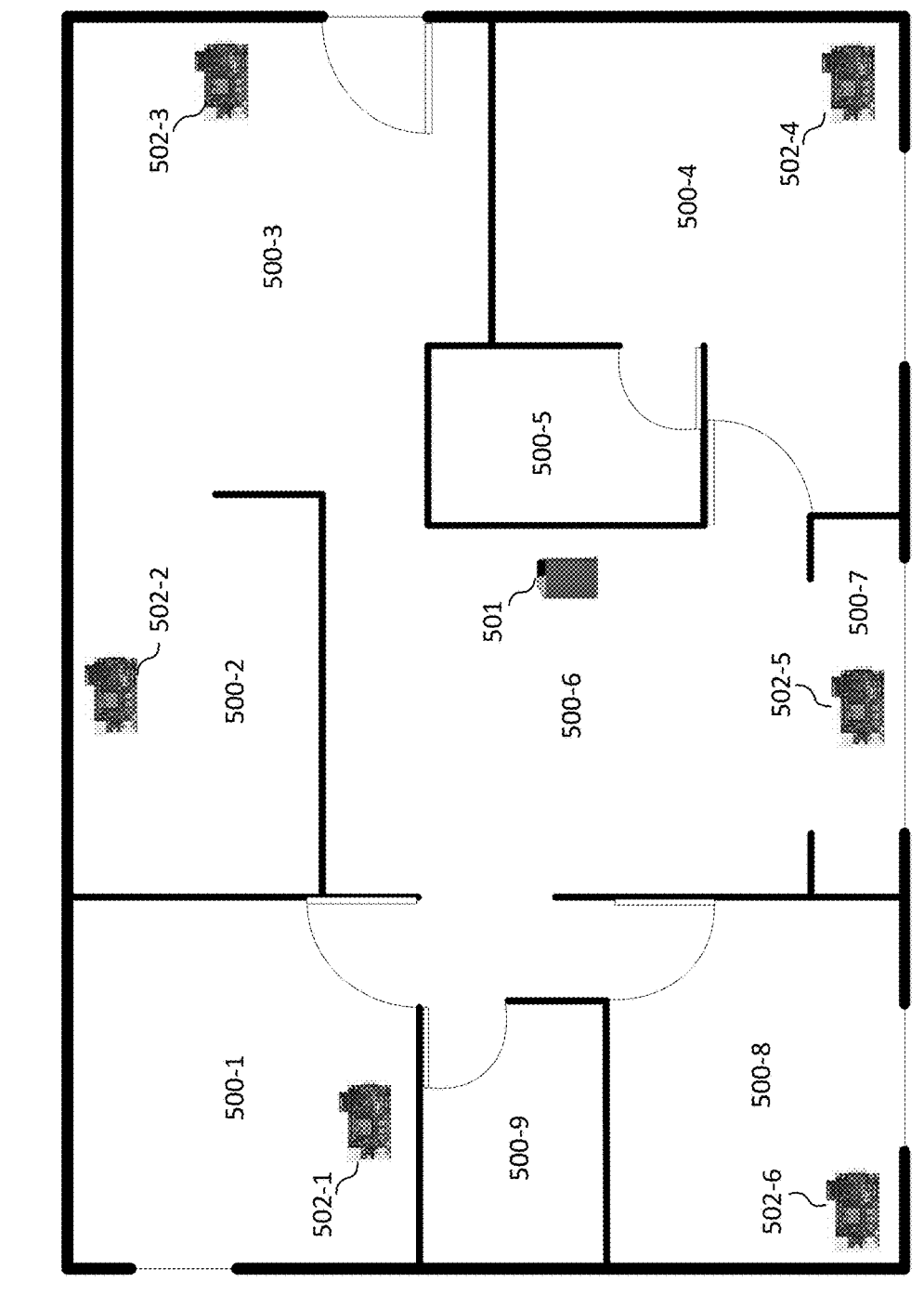
FIG. 5 shows an example site with a wireless gateway and multiple peripheral devices.

FIG. 5 shows an example site 500 with a wireless gateway 501 and multiple peripheral devices. The site 500 may be a house, apartment, office, or other building (or portion thereof). In the site 500, the wireless gateway 501 may be located in a substantially central location. The wireless gateway 501 may support more than one protocol. For example, the wireless gateway 501 may support first wireless communications via a first wireless communication protocol and second wireless communications via a second wireless communication protocol. There may be multiple peripheral devices, for example, peripheral devices 502-1 through 502-6 (collectively or generically, peripheral device(s) 502) that may be configured to communicate with the wireless gateway 501 via the second wireless communication protocol. The peripheral devices 502 may be positioned in substantially peripheral locations, for example, near the boundaries of the site 500. For example, these peripheral devices 502 may be IoT devices such as smart door locks, smart thermostats, etc. which may likely be located near the walls or other external boundaries of a house, apartment, office, or other building (or portion thereof). The communications may be invoked at a central location, for example, the wireless gateway 501. For example, the second wireless communications between multiple peripheral devices 502 may be concurrently triggered and data of metrics may be obtained. The site 500 may have multiple areas divided by walls. For example, the site 500 may have a study 500-1, a kitchen 500-2, a dining room 500-3, a master bedroom 500-4, a master bathroom 500-5, a living room 500-6, a balcony 500-7, a guest bedroom 500-8, and a guest bathroom 500-9. The positions of the wireless gateway 501 and peripheral devices 502 may be other positions. For example, the distances between one or more of the peripheral devices 502 and the wireless gateway 501 may be increased or reduced. The number of the peripheral devices 502 may be any other number. There may be more than one wireless gateway 501. The areas may be of other designs, differ in shape, size, divisions, etc. and have different configurations for residences, offices, etc. The walls may be thick or thin, closed or open, or there may be no walls. There may be furniture or other items in the site. There may be electronic devices that communicate via the first wireless communication protocol. Different wireless communication protocol environments as well as varying levels of interference to consume the communication channels may exist in different sites. For example, WI-FI traffic may be on 2.4 GHZ and/or on 5 GHz bands, with low, medium, or high load, with different channels, different channel utilizations, etc.

Each of the peripheral devices 502 may be configured to send and/or receive signals to and/or from the wireless gateway 501. The number and/or types of peripheral devices may be different. The peripheral devices may have different transmission power, frequency of transmission, and duration. For example, a Zigbee sniffer or protocol analyzer may be used to analyze MAC layer frames and extract information. Custom firmware may be written by using a Zigbee development kit to extract MAC layer information from the peripheral devices, if permitted. If simulated peripheral devices are used, for example, a simulated peripheral device may have a circuit board (e.g., reference board, development board) with a ZIGBEE chipset that has been customized with programmable parameters capable of transmitting a certain payload size at configurable intervals to the wireless gateway 501, which may serve as a ZIGBEE hub. For example, the simulated peripheral devices may generate ZIGBEE traffic every 5 seconds, 10 seconds, 15 seconds, etc. The programmable parameters may allow for configuration of transmission power level, frequency of transmission, and duration of test along with an accompanying set of counters and/or a counting function with visibility into the MAC layer. One or more of the programmable simulated peripheral devices may be turned off so as to change the number of peripheral devices in this test. The simulated peripheral devices may be programmed to mimic actual ZIGBEE sensors.

Figure 6:
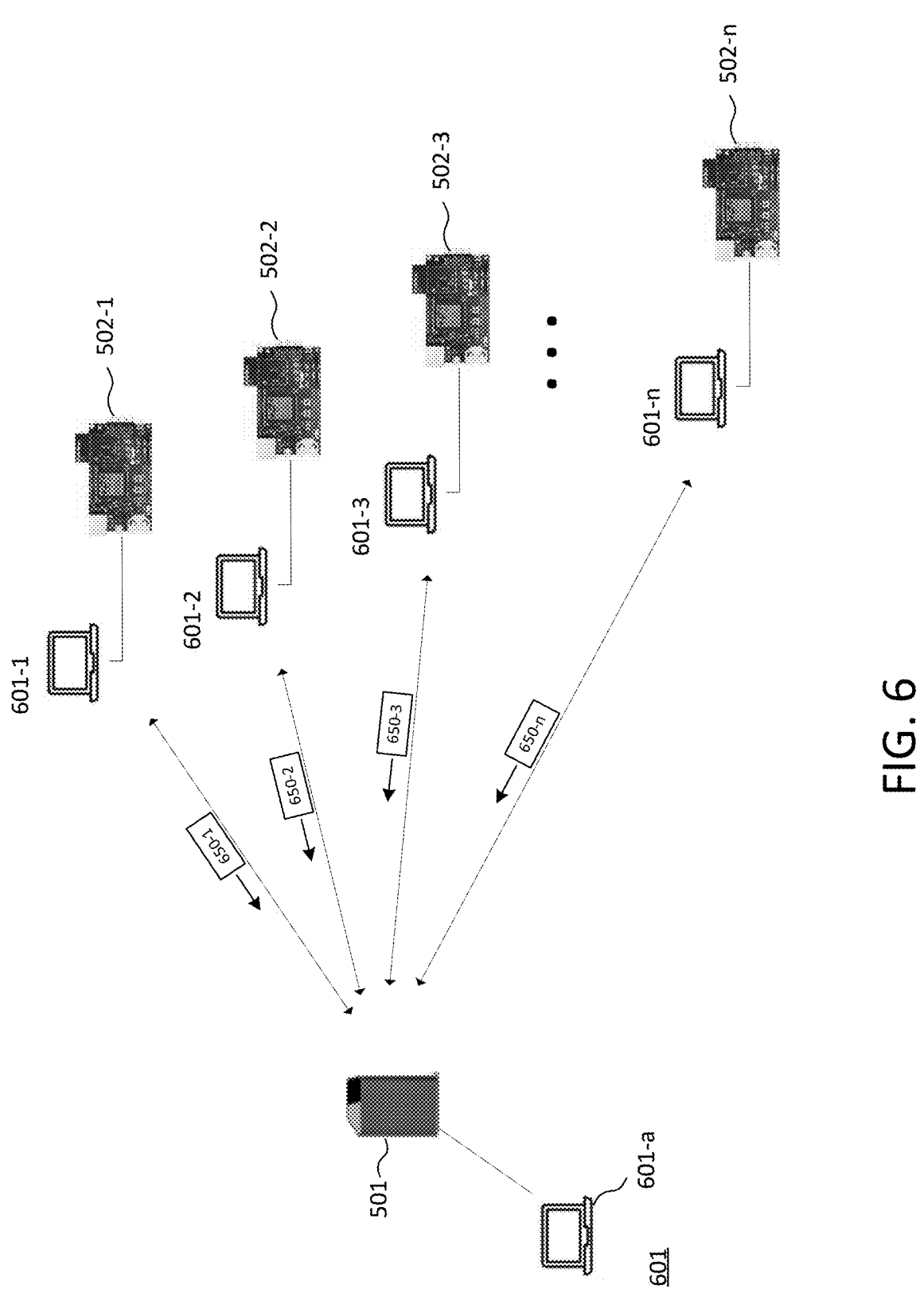
FIG. 6 shows example communications between the wireless gateway and peripheral devices.

FIG. 6 shows example communications between the wireless gateway 501 and the peripheral device 502-1 through 502-n (collectively 502). The wireless gateway 501 and/or the peripheral devices 502-1 through 502-n may comprise computing devices 601 (e.g., 601-a, 601-1, 601-2, 601-3, . . . 601-n). The computing devices 601 may be programmable chips and/or devices such as computers, laptops, tablets, smartphones, etc. The wireless gateway 501 and the peripheral devices 502 may send and receive second wireless communications in an environment shared with the first wireless communications. The peripheral devices 502 may receive signals of second wireless communications from the wireless gateway 501 and send signals back to the wireless gateway 501. Example content of the signals back to the wireless gateway 501 may comprise information 650 (e.g., 650-1, 650-2, 650-3, . . . 650-n) from the peripheral devices 502 for MAC layer metrics associated with the second wireless communications. Examples of such metrics may, for example, may comprise Mac Tx Bcast, Mac Rx Ucast, Mac Tx Ucast, Mac Tx Ucast Retry, Mac Tx Ucast Fail, APS Rx Bcast, APS Tx Bcast, APS Rx Ucast, APS Tx Ucast Success, APS Tx Ucast Retry, APS Tx Ucast Fail, Route Disc Initiated, Neighbor Added, Neighbor Removed, Neighbor Stale, Join Indication, Child Moved, ASH Overflow, ASH Frame Error, ASH Overrun Error, NWK FC Failure, APS FC Failure, ASH XOff, APS Unauthorized Key, NWK Decrypt Failures, APS Decrypt Failures, Packet Buffer Allocate Failures, Relayed Ucast, Phy to MAC queue limit reached, Packet Validate drop count, NWK retry overflow, CCA Failures, Broadcast table full, PTA Lo Pri Req. PTA Hi Pri Req. PTA Lo Pri Denied, PTA Hi Pri Denied, PTA Lo Pri Tx Abrt, PTA Hi Pri Tx Abrt, Address Conflict Sent, etc. If the traffic of the first wireless communications has a high load, there may be latency in the transmission and/or reception of the signals of the second wireless communications. The latency, RSSI level of the peripheral devices, MAC layer information, as well as other metrics such as environment characteristics (e.g., channel utilization, SNR, channel number, modem type, location, etc.), related to the first wireless communications and/or the second wireless communications, may be obtained as relevant data. At least the metrics related to the second wireless communications may change based on (e.g., in response to) the change of the metrics related to the environment characteristics associated with the first wireless communications. The wireless gateway 501 may enable one or more coexistence configurations such as PWM to improve the coexistence between the first wireless communications and the second wireless communications. This may cause the metrics related to the first wireless communications and/or the second wireless communications to change as well. The relevant data may be retrieved by a computing device by communicating with (e.g., receiving beacon frames from) the wireless gateway 501, as the wireless gateway may serve as a centralized location and may receive metrics sent from the multiple peripheral devices 502. The wireless gateway may contain access point information from other households (e.g., neighbors).

MAC layer information may reveal transmission/reception activities of actual packets, for example, how many packets have been transmitted, packet delivery latency, etc. This may provide more accurate information on the impact of interference, interference mitigation, etc. and may allow quantification of the performance of the wireless communications via different protocols (e.g., how the second wireless communications behave in the presence of varying levels of the first wireless communications). For example, MAC layer information such as MAC transmission (Tx) success, retries, failure may be used to quantify performance of wireless communications. MAC retry rate may indicate packet delivery error rate. MAC retries per message may indicate battery life for messages transmitted from a sleepy node. MAC error rate may indicate message delivery error rate or latency. These retries, errors, etc. may be obtained and/or calculated by using information 650 for MAC layer metrics such as MAC Tx Ucast, MAC Tx Ucast retry, MAC Tx Ucast Fail (as listed above), using the following formulas:

$$MAC \text{ retry } \% \text{ (packet delivery error rate)} = MAC \text{ Tx Ucast retry}/$$
$$(MAC \text{ Tx Ucast retry} + MAC \text{ Tx Ucast});$$
$$MAC \text{ retries per message} = MAC \text{ Tx Ucast retry}/$$
$$(MAC \text{ Tx Ucast Fail} + MAC \text{ Tx Ucast});$$
$$MAC \text{ error } \% \text{ (message delivery error rate)} = MAC \text{ Tx Ucast Fail}/$$
$$(MAC \text{ Tx Ucast Fail} + MAC \text{ Tx Ucast}).$$

RSSI values may be obtained from the wireless gateway 501.

Compared to other methods, where the interference and performance of communications may be evaluated by higher level metrics such as latency and/or SNR, the use of MAC layer information to quantify the performance provides more accurate and timely information on the details of interference, points of minor improvement or deterioration, etc., which makes it possible to create more precise solutions such as the PWM that leads to a balance of different protocols.

Also or alternatively, the site 500 may be more than a home, a house, an apartment, etc. For example, the site 500 may be multiple premises, a neighborhood, a community, and/or even a town, a city, a whole region, etc., that has parameters of coexistence of different protocols and optimal mitigation settings for the particular site. The configurations of wireless gateways, WI-FI settings, IoT settings, power levels, device locations, etc. may be customized for the particular site. This may greatly enhance user experience. Machine learning tools may be used to identify potentially optimal mitigation settings for different households, and these settings may be tested, confirmed or adjusted. Real-time relevant data collection and mitigation setting adjustment may be carried out dynamically, for example, for neighboring premises. Signal information among neighboring devices may be shared, and metrics data may be used communally. Different gateways may be designed to work together efficiently by adopting optimized mitigation settings. And these settings may be adaptive based on the wireless environment.

Figure 7:
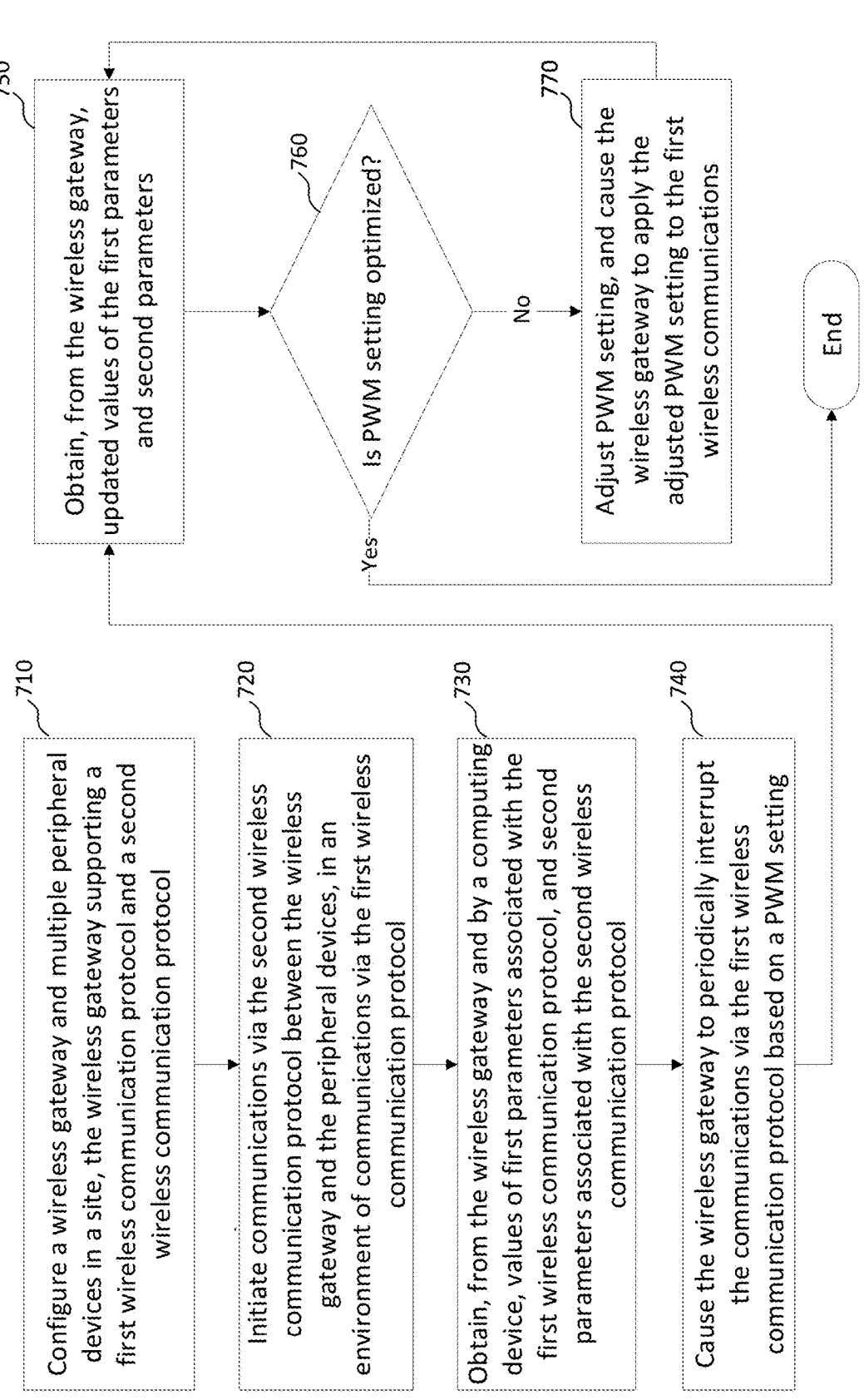
FIG. 7 is a flowchart showing an example method to obtain optimized PWM settings.

FIG. 7 is a flowchart showing an example method to obtain optimized PWM settings. For convenience, the example method of FIG. 7 is explained below using an example in which steps may be performed by a computing device. The computing device may comprise a wireless gateway (e.g., the gateway 501 in FIGS. 5 and 6, the gateway 111 in FIG. 1). However, one, some, or all steps of the example method may also or alternatively be performed by one or more other computing devices. One or more steps of the example method may be rearranged (e.g., performed in a different order), omitted, and/or otherwise modified, and/or other steps added. The example method of the flowchart in FIG. 7 may be repeated for different wireless gateways, different locations, different settings of peripheral devices, and different situations of the first wireless communications.

In step 710, a wireless gateway may be configured in a site. The wireless gateway may support at least first wireless communications via a first wireless communication protocol and second wireless communications via a second wireless communication protocol. A plurality of peripheral devices (e.g., the peripheral devices 502 in FIG. 5) may be configured in the site (e.g., site 500 in FIG. 5). The plurality of peripheral devices may have various parameters such as Tx power level, frequency, duration. These peripheral devices may be distributed near the perimeter of the site. The peripheral devices may be configured to carry out communications with the wireless gateway via the first and/or second wireless protocols.

In step 720, communications via the second wireless communication protocol between the wireless gateway and the plurality of peripheral devices may be initiated. Each of the plurality of peripheral devices may be designed to receive the second wireless communications from the wireless gateway and to send the second wireless communications to the wireless gateway. The second wireless communications that peripheral devices transmit may contain measurement values with respect to the functions of sensors in the peripheral devices, for example, temperature, humidity, motion, etc. The second wireless communications may occur in an environment of the first wireless communications. The first wireless communications may affect the second wireless communications. For example, if the first wireless communications have a high channel utilization (e.g., over 50%), the band (e.g., 2.4 GHZ) may be congested, which may impair the transmission and/or receiving of the second wireless communications.

In step 730, a computing device may obtain data related to first and/or second parameters associated with the first and/or second wireless communications. The first parameters associated with the first wireless communications may comprise at least SNR and channel utilization. The first parameters may also comprise average RSSI. If the first wireless communications are WI-FI wireless communications, these parameters may be obtained from IEEE 802.11 management frames and/or client lists of the wireless gateway. The second parameters associated with the second wireless communications may comprise at least MAC layer information such as retransmission rate, error rate, etc. The second parameters may also or alternatively comprise average RSSI. If the second wireless communications are ZIGBEE wireless communications, these parameters may be obtained from IEEE 802.15.4 management frames and/or client lists of the wireless gateway. The values of the first parameters and second parameters obtained in step 730 may correspond to the configurations in step 710.

In step 740, the computing device may select a PWM setting and cause the wireless gateway to apply the PWM setting to the first wireless communications, which may comprise interrupting the first wireless communications based on a duty cycle and a frequency. This PWM setting may affect the performance of the first wireless communications and/or of the second wireless communications. An optimized PWM setting may allow coexistence of the first wireless communications and the second wireless communications without significantly and/or noticeably (e.g., to users) impairing the performance of the first wireless communications (e.g., without noticeably decreasing throughput or increasing latency, etc.). The PWM setting selected in step 740 may comprise a duty cycle and frequency based on a default setting, a less aggressive setting, or a more aggressive setting. The PWM setting selected in step 740 may be selected based on the values as obtained in step 730. For example, if the values for the second wireless communications are poor (e.g., very high retransmission rate), a more aggressive setting may be selected. The PWM setting may also be selected based on one or more computer simulations, previous tests, historical data, and/or other sources.

In step 750, the computing device may obtain, in a manner similar to that described in connection with step 730, updated values of the first and/or second parameters associated with the first and/or second wireless communications. The application of the PWM setting to the first wireless communications in step 740 may have changed the values of the first and/or second parameters.

In step 760, a determination may be made as to whether a PWM setting has been optimized. For example, the computing device may be programmed to identify if the PWM setting causes a peak balancing point for the performance of the first wireless communications and the second wireless communications. At the peak balancing point, the values of the first parameters may show that the first wireless communications are impaired at the minimum, and the values of the second parameters may show that the second wireless communications still function. There may be one or more optimal PWM settings. If the computing device determines that an optimized PWM setting has been identified, the method may come to an end. If the computing device determines that the PWM setting has not been optimized, the computing device may in step 770 adjust the PWM setting and cause the wireless gateway to apply the adjusted PWM setting to the first wireless communications. The computing device may adjust or change the PWM setting, for example, based on comparing the updated parameter values obtained in step 750 with previous values (e.g., the values obtained in step 730). If the updated values of the second parameters obtained in step 750 are not better values (e.g., lower retransmission rate, lower error rate, and/or higher average RSSI) compared to the previous values, the computing device may change the PWM setting to be more aggressive (e.g., longer duty cycle and/or higher frequency), so that the performance of the second wireless communications may improve. If the updated values of the first parameters obtained from step 750 are much worse values (e.g., lower SNR, lower average RSSI) compared to the previous values, the computing device may change the PWM setting to be less aggressive (e.g., shorter duty cycle and/or lower frequency), so that the performance of the first wireless communications may be less impaired. The computing device may repeat step 750 to obtain updated values of the first and/or second parameters from the wireless gateway, for example, after the PWM setting is adjusted and applied in step 770. The example method of FIG. 7 may be used to identify optimal PWM setting(s) for each situation for the first wireless communications and/or the second wireless communications. For example, the first wireless communications may be in a situation of having a heavy load. Alternatively, the first wireless communications may be in a situation of having a medium load. The second wireless communications may comprise 10 peripheral devices. Alternatively, the second wireless communications may comprise 5 peripheral devices. The obtained data for each situation may be accumulated and form a database as records. Each of the records may comprise device information (e.g., number, type, ID, and/or name of peripheral devices, modem models, etc.) as well as the identified optimal PWM setting(s) and corresponding values of the first and second parameters. The data may involve more than two wireless communication protocols. The database may be stored in a wireless gateway, in the coexistence server 122 (in FIG. 1), and/or in another computing device. The database may be customized for a particular house, an apartment, an office, multiple premises with similar units, etc. The database may be a general database for a building, a community, a geographic region, and/or anywhere that may have similar devices of the wireless communications. The database may be regularly or dynamically updated based on changes in the devices of the wireless communications. The database may comprise other data such as level of interference, etc. A computing device may communicate with the database to select optimal PWM settings based on metrics available in the database. The computing device may obtain real-time values of at least some of the metrics from a wireless gateway and/or from other devices, and may use the values to look up optimal PWM settings in the database. Users may also be involved in choosing and/or applying the optimal PWM settings, for example, during a diagnosis or troubleshooting process, and/or when conflicts between different wireless communications arise. When conflicts or issues arise, it may be advantageous for automatic selection and application of optimal PWM settings to be carried out without human intervention. There may be a situation where no PWM setting may realize coexistence of more than one wireless communication protocol without significant and/or noticeable performance degradation of at least one of the protocols. For example, when first wireless communications have a very heavy load (e.g., when twelve peripheral devices including four laptops, four smartphones, two smart TVs and two tablets are streaming at the same time), to enable normal operation of second wireless communications, one or more of the peripheral devices may need to be turned off. The choice of which device(s) may be turned off may, for example, be based on a user selection.

Figure 8B:
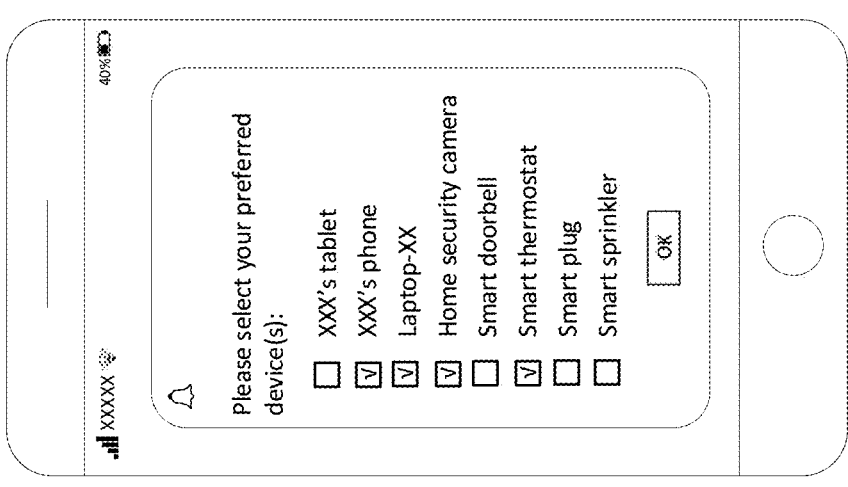
FIGS. 8A, 8B, 8C and 8D show examples of user interfaces.
Figure 8A:
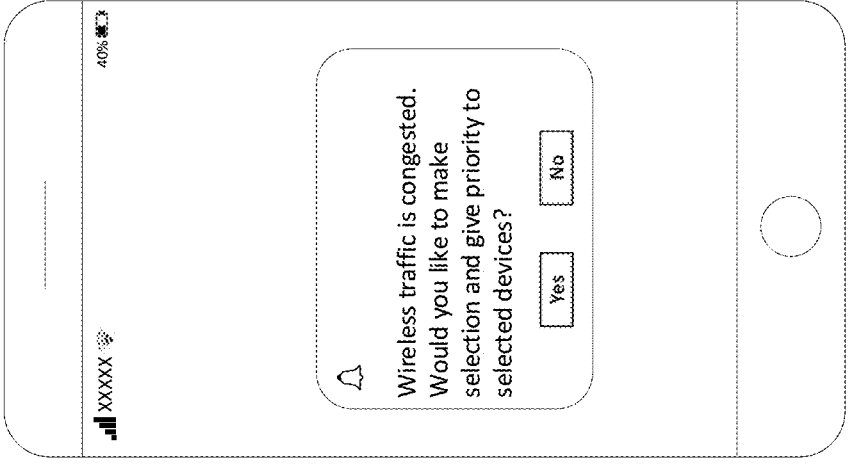
Figure 8D:
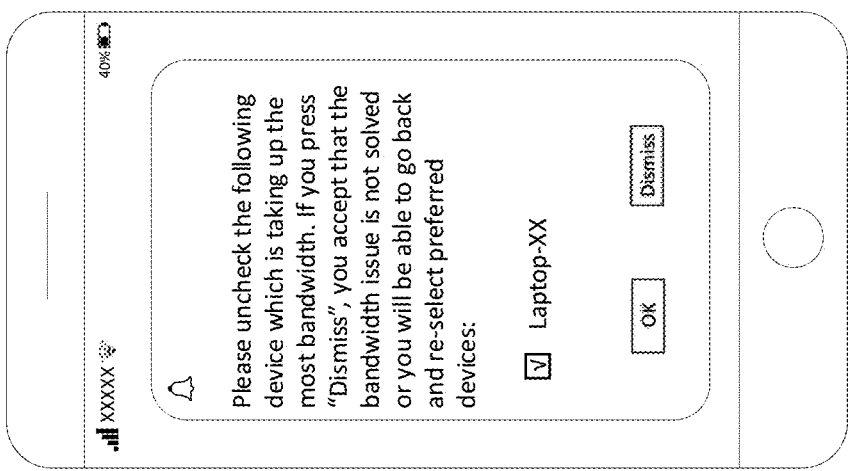
Figure 8C:
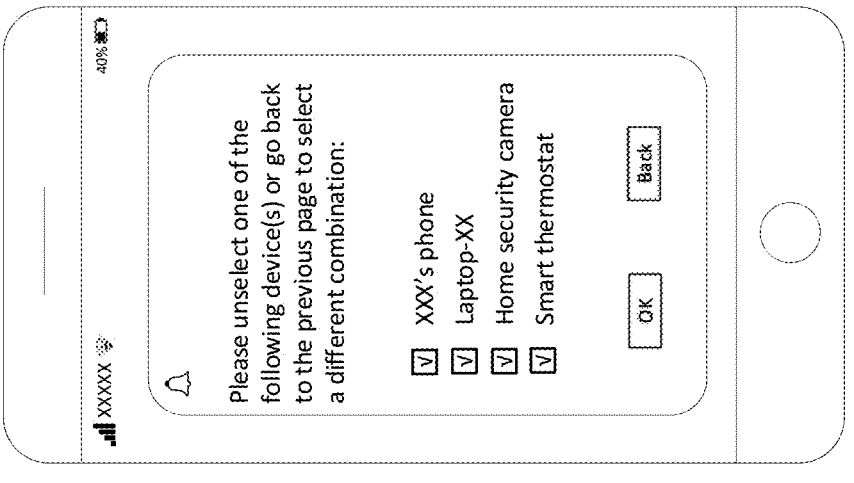

FIGS. 8A, 8B, 8C and 8D show examples of user interfaces. FIGS. 8A and 8B show example user interfaces for receiving user input related to selecting user-preferred peripheral devices if conflicts (e.g., severe conflicts) among signals of different wireless communication protocols are detected. FIGS. 8C and 8D show example user interfaces for suggesting the user revise their selection if conflicts still exist. A computing device may receive values of the first and/or second parameters associated with the first and/or second wireless communications and may determine that the level of interference is at a Severe level based on the received values. The Severe level may indicate that even an optimal PWM setting may result in significant and/or noticeable performance degradation of the first wireless communications and/or may insufficiently reduce interference with the second wireless communications. This level and corresponding values of parameters may be stored in the database and may be based on, for example, historical data. Because the Severe level may affect user experience significantly, the computing device may notify a relevant user and provide that user with choices to minimize the impact on their experience.

In FIG. 8A, for example, there may be a notification message shown on a screen of a computing device (e.g., a smartphone) stating "Wireless traffic is congested. Would you like to make selection and give priority to selected devices?" The user may choose not to proceed by for example pressing a button (e.g., "No"), and the computing device may instruct the wireless gateway to apply an optimal PWM setting. This setting may adversely affect the performance of the first wireless communications, as the level of interference is at a Severe level. The user may choose to proceed by pressing a button (e.g., "Yes"), and a message as shown in FIG. 8B may be output. The message in FIG. 8B may list all the peripheral/client devices that communicate via the first wireless communication protocol and/or the second wireless communication protocol. For example, listed client devices may comprise a tablet, a smartphone, a laptop, a home security camera, etc., which usually communicate via the first wireless communication protocol. Listed client devices may also or alternatively comprise a smart doorbell, a smart thermostat, a smart plug, a smart sprinkler, etc., which usually communicate via the second wireless communication protocol. The user may select one or more devices as preferred device(s) among all those listed. Based on the user's selection, the computing device may communicate with the database with updated metrics and select an optimal PWM setting to apply to a relevant wireless gateway. The updated metrics may comprise obtained values of the first and/or second parameters associated with the first and/or second wireless communications as well as the changed device information (e.g., an updated client list and related telemetry data) of the peripheral devices associated with the first and/or second wireless communications. The database may have corresponding data related to device information of the peripheral devices and the first and/or second parameters, and an optimal PWM setting may be looked up and retrieved.

For example, in FIG. 8B, the user may select smartphone, laptop, home security camera, and smart thermostat as the preferred devices. In this situation, the number of peripheral devices of the second wireless communications becomes one, and the peripheral devices of the first wireless communications comprise the smartphone, laptop, and the home security camera. If the user selects a button (e.g., "OK" in FIG. 8B) to confirm the selection of device(s), the computing device may send updated information to the database and retrieve an optimal PWM setting. The computing device may instruct a wireless gateway for the first wireless communications to apply the PWM setting. The computing device may cause the unselected devices to discontinue transmission. The computing device may obtain updated values of the first and/or second parameters and determine if the level of interference is still at Severe level. If no, there may be no more messages via user interfaces such as those of FIGS. 8A and 8B, or there may be a message informing the user that the issue has been solved. If yes, the computing device may provide a further notification such as the one in FIG. 8C. In FIG. 8C, a message may list all the devices that the user selected in a previous message and ask the user to unselect one of them. The user may have an option to go back to the previous message (e.g., as shown in FIG. 8B) to select a different combination of peripheral devices. The computing device may also identify at least one peripheral device that is taking up the most bandwidth and suggest the user to turn that device off. In FIG. 8D, for example, a message may suggest the user to uncheck a peripheral device that is taking up the most bandwidth. The user may do as suggested, or the user may choose not to do that and accept that the bandwidth issue is not solved. For example, the user may choose to reject the offer by pressing a button (e.g. "Dismiss" in FIG. 8D), or to accept the offer by for example unchecking the device and clicking "OK". If the user rejects the offer, another notification may be output, telling the user that he and/or she may go back to re-select preferred devices or accept the consequence that the issue is not solved.

Figure 9A:
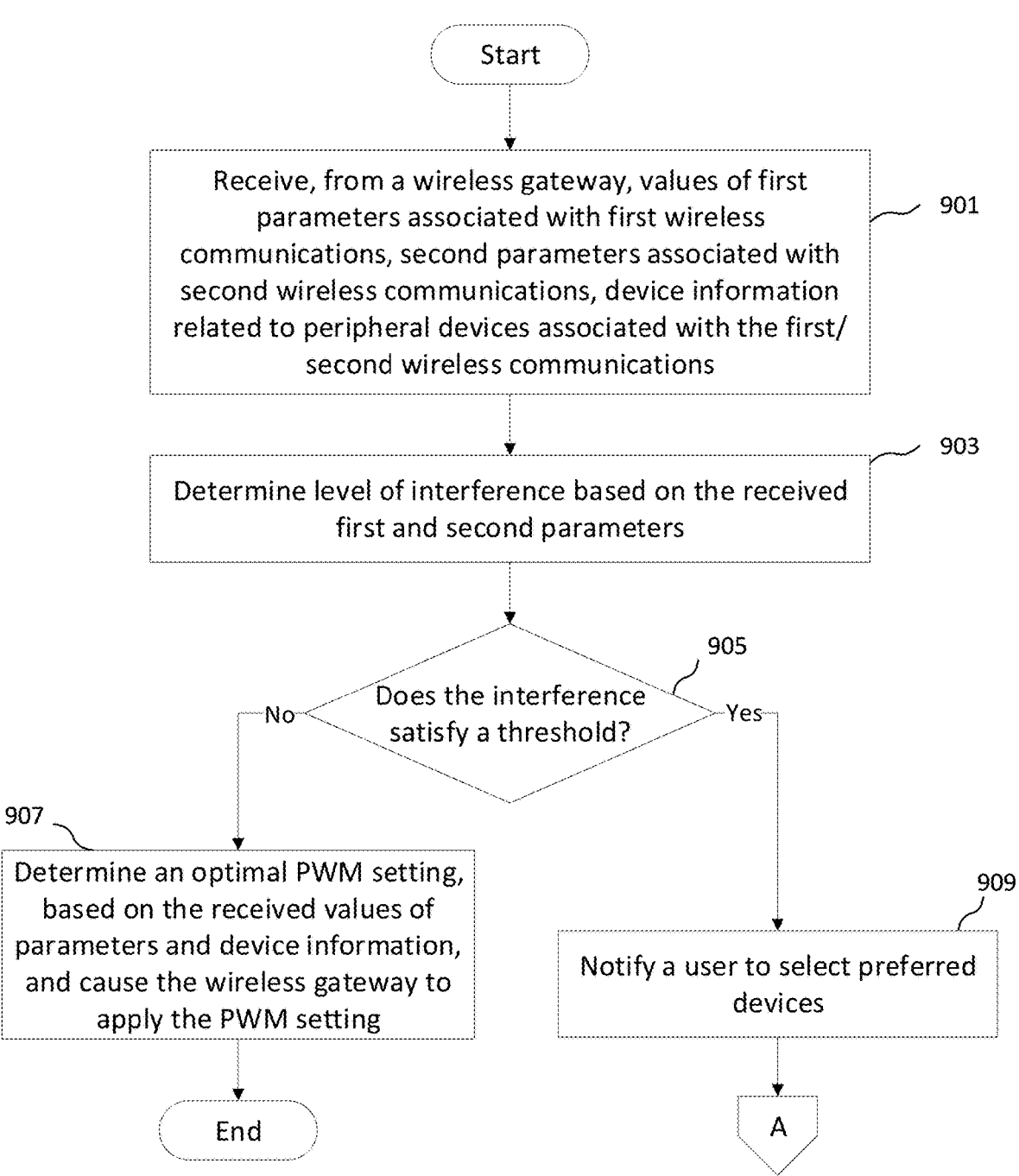
FIG. 9A and FIG. 9B are a flowchart showing an example method of selecting and applying a PWM setting based on parameters, device information, and/or user preference.
Figure 9B:
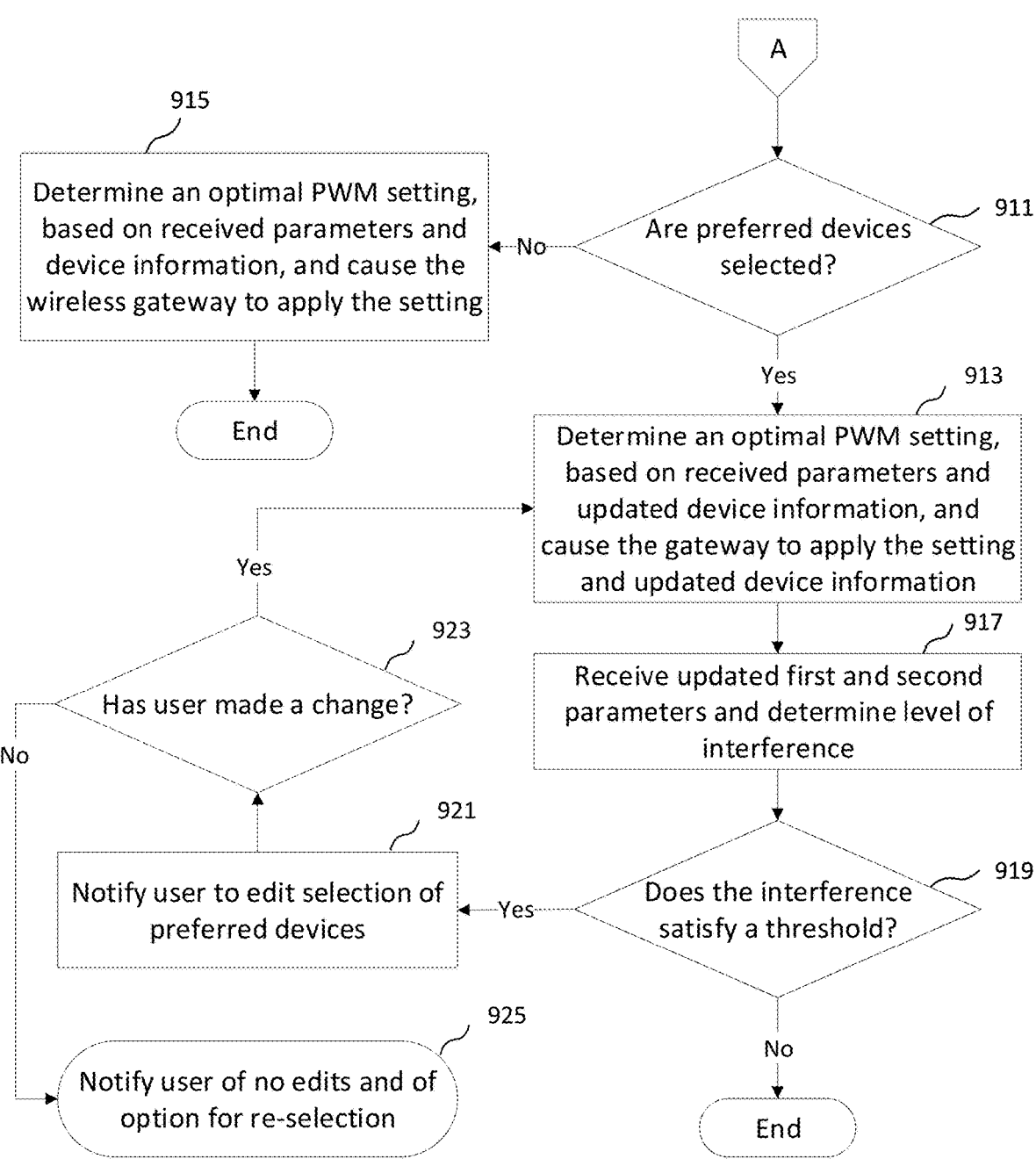

FIG. 9A and FIG. 9B are a flowchart showing an example method of selecting and applying a PWM setting based on parameters, device information, and user preference. For convenience, the example method of FIGS. 9A-9B is explained below using an example in which steps may be performed by a computing device. That computing device may comprise wireless gateway, as described above in connection with FIG. 4A. One, some, or all steps of the example method of FIG. 9A and FIG. 9B may also or alternatively be performed by one or more other computing devices (e.g., the wireless devices 116, IoT devices 118, etc. in FIG. 1). One or more steps of the example method may be rearranged (e.g., performed in a different order), omitted, and/or otherwise modified, and/or other steps added.

In step 901 (see FIG. 9A), a computing device may receive, from a wireless gateway, values of first parameters associated with first wireless communications via a first wireless communication protocol and second parameters associated with second wireless communications via a second wireless communication protocol. Also, the computing device may receive device information related to peripheral devices associated with the first wireless communications and the second wireless communications. The first parameters, second parameters, and device information may be the same as and/or similar to, and may be obtained in ways similar to, first parameters, second parameters, and device information described above (e.g., in connection with FIGS. 4A, 4B and 7). The computing device may constantly and/or regularly receive such values and device information from the wireless gateway as part of a monitoring process for the performance of the at least two wireless communications. Alternatively, the computing device may communicate with the wireless gateway to get data related to the wireless communications only during a diagnostic process.

In step 903, the computing device may determine level of interference based on the received values of the first and second parameters. The level of interference may be determined as described above in connection with FIGS. 4A and 4B.

In step 905, there may be a determination of whether the interference satisfies a threshold. If it is determined that the interference satisfies a threshold (e.g., is severe), in step 909, the computing device may notify a user to select preferred devices. Messages such as the ones as shown in FIGS. 8A and 8B may be used for the notification. If interference does not satisfy the threshold (e.g., is not severe), in step 907, the computing device may determine a PWM setting by comparing values of the first and second parameters as well as device information related to peripheral devices associated with the first wireless communications and the second wireless communications with values in one or more records of the database. The computing device may perform such determination by itself (e.g., if the computing device stores the database), or may send values of the first and second parameters as well as device information related to the peripheral devices to another computing device storing the database, with the other computing device performing the look up and returning the PWM setting. The records may contain data such as device information (e.g., number, type, ID, and/or name of peripheral devices, modem models, etc.) as well as the identified optimal PWM setting(s) and corresponding values of the first and second parameters, as described above in connection with FIG. 7. Alternatively, the computing device may determine an optimal PWM setting on-site by using the method as described above in connection with FIG. 7. The computing device may cause the wireless gateway to apply the PWM setting to the first wireless communications, which may indicate causing the wireless gateway to interrupt the first wireless communications based on a selected duty cycle and frequency. The method may come to an end after step 907, as the interference issue may be solved after application of the PWM setting.

In step 911 (see FIG. 9B), the computing device may determine if the user has selected preferred devices. The computing device may make the determination based on detection of user actions such as checking at least one check box and clicking the "OK" button. If the computing device determines that preferred devices have been selected, the computing device may in step 913 determine an optimal PWM setting by comparing values of the first and second parameters as well as updated device information related to peripheral devices associated with the first wireless communications and the second wireless communications with values and device information in one or more records of the database. The computing device may perform such determination by itself (e.g., if the computing device stores the database), or may send values of the first and second parameters as well as updated device information related to the peripheral devices to another computing device storing the database, with the other computing device performing the look up and returning the PWM setting. The records may contain data such as device information (e.g., number, type, ID, and/or name of peripheral devices, modem models, etc.) as well as the identified optimal PWM setting(s) and corresponding values of the first and second parameters. The updated device information related to peripheral devices of the first wireless communications and the second wireless communications may correspond to the selection of preferred devices. For example, in FIG. 8B, the user selected the smartphone, laptop, home security camera, and smart thermostat out of a list of eight peripheral devices. In that example, the number of peripheral devices communicating via the second wireless communication protocol (e.g., ZIG-BEE wireless communication protocol) has decreased from four to one. The tablet that runs on the first wireless communication protocol (e.g., WI-FI wireless communication protocol) is no longer in the client list. Thus, the device information related to peripheral devices have been changed or updated. An optimal PWM setting that suits this changed situation may be selected. Alternatively, the computing device may determine an updated optimal PWM setting on-site by using the method as described above in connection with FIG. 7. The computing device may cause the wireless gateway to apply the PWM setting to the first wireless communications, which may indicate causing the wireless gateway to interrupt the first wireless communications based on a selected duty cycle and frequency. The computing device may also cause the wireless gateway to apply the updated device information, for example, by causing the unselected devices to reduce communications or discontinue transmission. If the computing device determines that preferred devices have not been selected, the computing device may in step 915 determine an optimal PWM setting based on the original values of the first and/or second parameters and device information, as described above in connection with step 907. The method may come to an end after step 915.

In step 917, after the optimal PWM setting has been applied in step 913, the computing device may receive updated values of the first and second parameters and may determine level of interference based on the updated values, in a way similar to in step 903. In step 919, similarly to step 905, the computing device may determine if the interference satisfy a threshold (e.g., is severe). If the computing device determines that the interference does not satisfy the threshold (e.g., is not severe), the method may come to an end. If the computing device determines that the interference satisfies the threshold (e.g., is severe), the computing device may in step 921 notify the user to edit selection of preferred devices. For example, the computing device may suggest turning off (e.g., unchecking) one or more peripheral devices. Example messages may be shown in FIGS. 8C and 8D.

In step 923, the computing device may determine if the user has made a change. The computing device may make the determination based on detection of user actions. If the computing device determines that the user has not made a change (e.g., the user may press button "Dismiss"), the method may come to an end after step 923, and the user may be notified that no edits have been made and that edits may improve performance and/or allow previously disconnected devices to communicate. The computing device may also give the user an option to go back for re-selection of preferred devices. If the computing device determines in step 923 that the user has made a change (e.g., the user has edited the selection and clicked "OK"), the computing device may in step 913 select and/or determine and apply a new optimal PWM setting based on the values of parameters and updated device information of peripheral devices, and may in step 913 cause the wireless gateway to apply the updated device information, for example, by causing the unselected devices to reduce communications or discontinue transmission, as described above in connection with step 913.

Although the coexistence configuration has been described with a focus on PWM, other mitigation features such as PTA (Packet Traffic Arbitration) and antenna diversity may be used.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device and for wireless communications via a first protocol, one or more first values for one or more first parameters;
   determining, for wireless communications via a second protocol, one or more second values for one or more second parameters, wherein the one or more second
parameters comprise Media Access Control (MAC)
layer traffic parameters;
determining, based on the one or more first values and the
one or more second values, a time duration and a
frequency for periodic interruptions of wireless com-
munications via the first protocol; and
causing one or more wireless gateways to add the periodic
interruptions to the wireless communications via the
first protocol.
2. The method of claim 1, wherein the causing further
comprises causing the one or more wireless gateways to
continue, during the wireless communications via the first
protocol with the added periodic interruptions, the wireless
communications via the second protocol.
3. The method of claim 1, further comprising:
determining, for the wireless communications via the first
protocol with the added periodic interruptions, one or
more third values for the one or more first parameters;
and
causing, based on the determined one or more third
values, the periodic interruptions to be discontinued.
4. The method of claim 1, wherein the one or more first
parameters comprise channel utilization.
5. The method of claim 1, wherein the one or more second
parameters comprise retransmission rate, error rate, and
average Received Signal Strength Indicator (RSSI).
6. The method of claim 1, further comprising:
determining, based on the one or more first values and
based on the one or more second values, to enable
periodic interruptions of wireless communications via
the first protocol, wherein the determining the time
duration and the frequency is further based on the
determining to enable periodic interruptions.
7. The method of claim 1, wherein the determining the
time duration and the frequency comprises:
determining, based on comparing the one or more first
values and the one or more second values with prede-
termined threshold values, a level of interference asso-
ciated with the wireless communications via the second
protocol; and
determining, based on the determined level, the time
duration and the frequency.
8. The method of claim 1, wherein the determining the
time duration and the frequency comprises:
sending, by the computing device to a second computing
device, the one or more first values and the one or more
second values; and
receiving, from the second computing device, the time
duration and the frequency.
9. The method of claim 1, wherein the first protocol
comprises an IEEE 802.11 protocol, and wherein the second
protocol comprises one or more of an IEEE 802.15.4 pro-
tocol, a ZIGBEE protocol, or a BLUETOOTH Low Energy
(BLE) protocol.
10. The method of claim 1, wherein the computing device
comprises the one or more wireless gateways.
11. The method of claim 1, wherein the first protocol
comprises a protocol for local area network wireless com-
munications, wherein the second protocol comprises a pro-
tocol for personal area network wireless communications,
and wherein power associated with the wireless communi-
cations via the second protocol is lower than power associ-
ated with the wireless communications via the first protocol.

12. The method of claim 1, further comprising:
determining a level of interference between wireless
communications via the first protocol and wireless
communications via the second protocol;
requesting, based on the determined level of interference
satisfying a threshold, a user input; and
causing, based on received user input, one or more client
devices to cease communications via the first protocol,
wherein the determining the one or more first values
and the determining the one or more second values are
performed after the causing the one or more client
devices to cease communications.
13. A method comprising:
determining, by a computing device and for wireless
communications via a first protocol for local area
network wireless communications, one or more first
values for one or more first parameters;
determining, for wireless communications via a second
protocol for network wireless communications, one or
more second values for one or more second parameters,
wherein power associated with the wireless communi-
cations via the second protocol is lower than power
associated with the wireless communications via the
first protocol, and wherein the one or more second
parameters comprise Media Access Control (MAC)
layer traffic parameters;
determining, based on the one or more first values and
based on the one or more second values, to enable
periodic interruptions of wireless communications via
the first protocol; and
causing one or more wireless gateways to add the periodic
interruptions to the wireless communications via the
first protocol.
14. The method of claim 13, wherein the one or more first
parameters comprise channel utilization.
15. The method of claim 13, wherein the one or more
second parameters comprise retransmission rate, error rate,
and average Received Signal Strength Indicator (RSSI).
16. The method of claim 13, wherein the computing
device comprises the one or more wireless gateways.
17. A method comprising:
determining, by a computing device, a level of interfer-
ence between wireless communications via a first pro-
tocol and wireless communications via a second pro-
tocol;
requesting, based on determining that the level of inter-
ference satisfies a threshold, a user input;
causing, based on received user input, one or more client
devices to cease communications via the first protocol;
determining, after the causing the one or more client
devices to cease communications via the first protocol,
periodic interruptions of wireless communications via
the first protocol; and
causing one or more wireless gateways to add the periodic
interruptions to the wireless communications via the
first protocol.
18. The method of claim 17, wherein the determining the
level of interference is based on one or more of:
one or more values, associated with the wireless commu-
nications via the first protocol, for channel utilization,
or
one or more values, associated with the wireless commu-
nications via the second protocol, for one or more of
retransmission rate, error rate, or average Received
Signal Strength Indicator (RSSI).
19. The method of claim 17, wherein the first protocol
comprises an IEEE 802.11 protocol, and wherein the second protocol comprises one or more of an IEEE 802.15.4 protocol, a ZIGBEE protocol, or a BLUETOOTH Low Energy (BLE) protocol.

20. The method of claim 17, wherein the computing device comprises the one or more wireless gateways.

21. The method of claim 17, wherein requesting the user input comprises causing output of an interface for receiving user input.

\*    \*    \*    \*    \*